United States Patent
Gagnon et al.

(10) Patent No.: US 11,016,772 B2
(45) Date of Patent: May 25, 2021

(54) SYSTEM AND METHOD FOR EXECUTING SCRIPTS IN A VIRTUAL NETWORK FUNCTION

(71) Applicant: EXFO Service Assurance Inc., Chelmsford, MA (US)

(72) Inventors: Yves Gagnon, Laval (CA); Andrei Radulescu-Banu, Lexington, MA (US)

(73) Assignee: EXFO Inc., Québec (CA)

( * ) Notice: Subject to any disclaimer, the term of this patent is extended or adjusted under 35 U.S.C. 154(b) by 436 days.

(21) Appl. No.: 15/947,015

(22) Filed: Apr. 6, 2018

(65) Prior Publication Data

US 2019/0196837 A1 Jun. 27, 2019

Related U.S. Application Data

(60) Provisional application No. 62/609,658, filed on Dec. 22, 2017.

(51) Int. Cl.
  *G06F 9/38* (2018.01)
  *H04L 29/08* (2006.01)
  *G06F 9/455* (2018.01)
  *G06F 9/54* (2006.01)

(52) U.S. Cl.
  CPC ........ *G06F 9/3836* (2013.01); *G06F 9/45512* (2013.01); *G06F 9/45558* (2013.01); *G06F 9/547* (2013.01); *H04L 67/2804* (2013.01); *G06F 2009/45595* (2013.01)

(58) Field of Classification Search
  CPC .... G06F 9/3836; G06F 9/45512; G06F 9/547; G06F 9/45558; G06F 2009/45595; G06F 9/54; G06F 2209/549; H04L 67/2804; H04L 67/06; H04L 67/02; H04L 67/12; H04L 41/0806; H04L 43/50; H04L 67/2823; H04L 63/0272; H04L 63/168; H04L 41/5009; H04L 41/5038
  See application file for complete search history.

(56) References Cited

U.S. PATENT DOCUMENTS

| | | | |
|---|---|---|---|
| 9,485,231 B1* | 11/2016 | Reese | H04L 63/061 |
| 10,140,147 B2* | 11/2018 | Stephens | H04W 84/18 |
| 2016/0234689 A1* | 8/2016 | Stan | H04L 41/0803 |
| 2016/0366014 A1* | 12/2016 | Koo | H04L 12/4641 |
| 2017/0223530 A1* | 8/2017 | Marquardt | H04L 67/14 |
| 2018/0288179 A1* | 10/2018 | Bhatia | H04L 67/12 |
| 2018/0302239 A1* | 10/2018 | Ying | H04L 12/4675 |

(Continued)

*Primary Examiner* — Nicholas R Taylor
*Assistant Examiner* — Tania M Pena-Santana
(74) *Attorney, Agent, or Firm* — Clements Bernard Walker; Lawrence A. Baratta, Jr.

(57) ABSTRACT

A method and system for proxy scripting in a network functions virtualization environment is disclosed. The method comprises the step of sending scripting instructions from a server to a proxy virtual network function, the scripting instructions being indicative of a script to be executed on a target virtual network function. Then, in response to receiving the scripting instructions by the proxy virtual network function, opening a remote command execution session from the proxy virtual network function to the target virtual network function. Then, the method further includes sending the script from the proxy virtual network function to the target virtual network function, before executing the script on the target virtual network function.

23 Claims, 6 Drawing Sheets

(56) References Cited

U.S. PATENT DOCUMENTS

2018/0324261 A1* 11/2018 Yi ........................... H04L 67/16
2019/0028350 A1*  1/2019 Yeung ................. H04L 43/0817
2019/0104047 A1*  4/2019 Tejaprakash ............ H04L 41/22

* cited by examiner

SYSTEM AND METHOD FOR EXECUTING SCRIPTS IN A VIRTUAL NETWORK FUNCTION

CROSS-REFERENCE TO RELATED APPLICATIONS

This disclosure claims priority of U.S. provisional patent application No. 62/609,658 filed Dec. 22, 2017 which is hereby incorporated by reference.

TECHNICAL FIELD

This disclosure relates generally to a Network Functions Virtualization (NFV) environment, and more particularly, to the testing and monitoring of Virtual Network Functions (VNFs).

BACKGROUND ART

Virtual networks combine hardware and software resources and functionality in order to provide software-based network administration. By constructing logical networks that are decoupled from physical servers and/or networking hardware, it is possible to optimize network speed, reliability, flexibility, scalability and security. Use of virtualization techniques has led to network functionality being decoupled from proprietary hardware, and has allowed cloud computing architecture to be deployed across commoditized hardware. For example, cloud computing software platforms (such as, for example, OpenStack™), have been developed to control diverse, multi-vendor hardware pools of processing, storage, and networking resources.

Network Functions Virtualization (NFV) is a cloud-based networking architecture, proposed by the European Telecommunications Standards Institute (ETSI), which seeks to virtualize network tasks as Virtualized Network Functions (VNFs), so that they can be deployed modularly in Virtual Machines (VMs) throughout a network. Examples of such network functions include session border controllers, load balancers, firewalls, etc. According to the NFV architecture, cloud service providers use NFV Orchestrators (NFVOs), which work in conjunction with VNF Managers (VNFMs), to deploy VNFs in a network, as opposed to specialized hardware components. NFVOs create instantiate), coordinate, connect, scale and monitor VNF services, depending on customer needs.

One significant advantage of the NFV architecture is that instantiated VNFs can be used to test network services in order to provide service assurance. This architecture also provides a high degree of flexibility, as network functions and services can be instantiated, scaled and monitored without knowledge of the network's underlying hardware architecture.

In part as a result of this high degree of flexibility, NFV poses a number of security challenges. For example, the reliance on additional software (e.g. orchestrators) results in a longer chain of trust. Moreover, hardware resource pooling, and the blurring and removal of boundaries between hardware and software resources also contribute to an increase in security complexity. These challenges are met in part by establishing security on each layer of the NFV, as well as by the partitioning of a network into multiple security zones, each zone being defined by a distinct set of security policies.

While the addition of centralized orchestration in NFV alleviates most of the operational burden of running multiple security zones, these burdens remain for interactions with a specific VNF initiated outside of that VNF's network (or security zone). Such interactions include testing and characterising VNFs in a secured network, from a test computer connected to a potentially unsecured network, and require the running of scripts on the VNF. Using prior art means, setting up the security required to have a VNF run such a script is cumbersome and time consuming.

SUMMARY

One aspect relates to a method of proxy scripting in a network functions virtualization environment, the method comprises the steps of sending scripting instructions from a virtual server to a proxy virtual network function, the scripting instructions being indicative of a script to be executed on a target virtual network function; in response to receiving the scripting instructions by the proxy virtual network function, opening a remote command execution session from the proxy virtual network function to the target virtual network function; sending the script from the proxy virtual network function to the target virtual network function; and executing the script on the target virtual network function.

A second aspect relates to a non-transitory computer readable medium storing a computer program comprising executable instructions that when executed by a computer cause the computer to implement a method that comprises the steps of: sending scripting instructions from a server to a proxy virtual network function, the scripting instructions being indicative of a script to be executed on a target virtual network function; in response to receiving the scripting instructions by the proxy virtual network function, opening a remote command execution session from the proxy virtual network function to the target virtual network function; sending the script from the proxy virtual network function to the target virtual network function; and executing the script on the target virtual network function.

A third aspect relates to a system for proxy scripting in a network functions virtualization network, the system comprises a server arranged to send scripting instructions to a proxy virtual network function, the scripting instructions being indicative of a script to be executed on a target virtual network function; a proxy virtual network function arranged to, upon execution of the scripting instructions, open a remote command execution session with the target virtual network function and send the script to the target virtual network function; and a target virtual network function arranged to receive the script from the proxy virtual network function and execute the script.

BRIEF DESCRIPTION OF THE DRAWINGS

A detailed description of embodiments is provided below, by way of example only, with reference to the accompanying drawings, in which.

DETAILED DESCRIPTION

Figure 1:
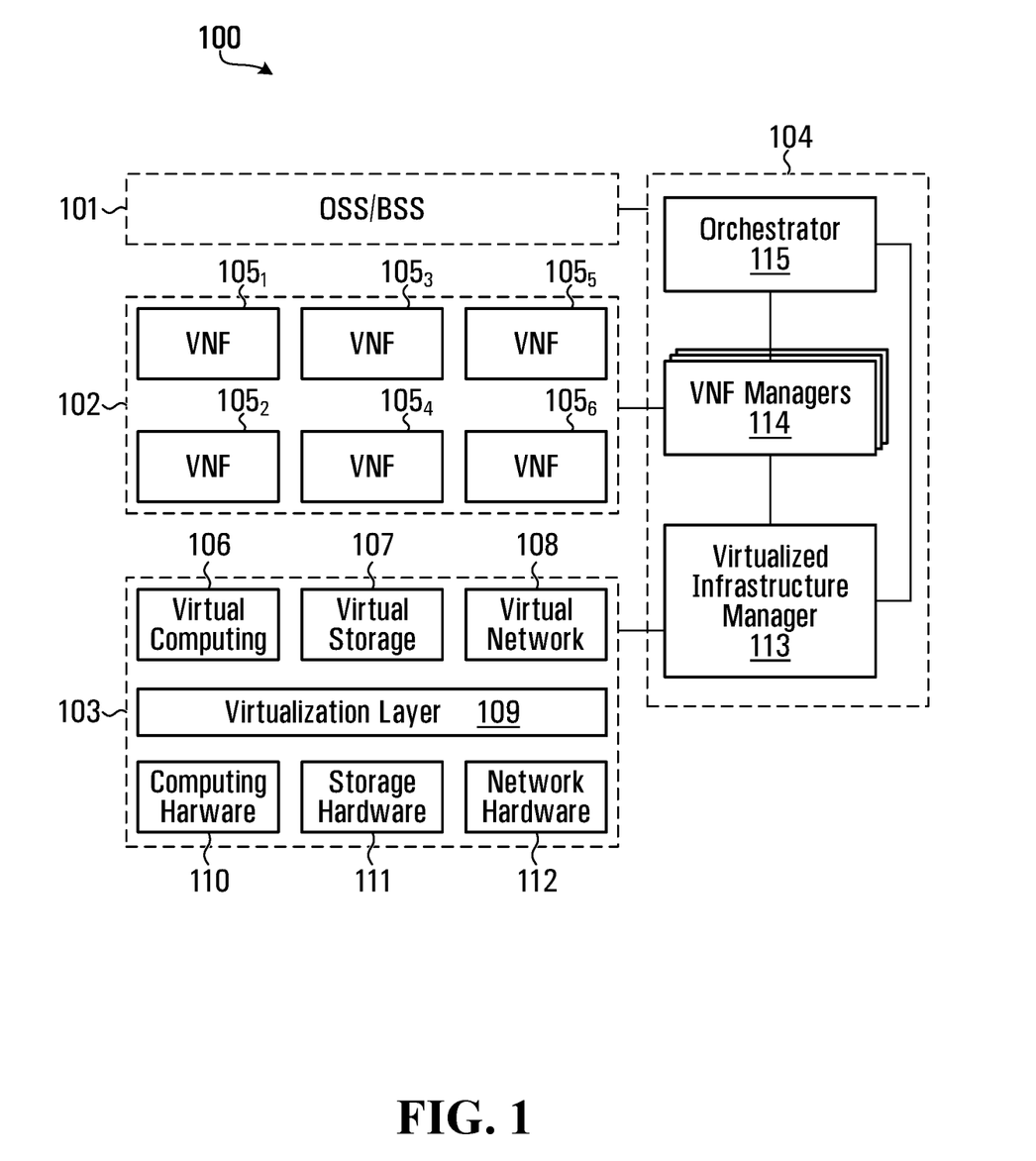
FIG. 1 illustrates a simplified diagram of the Network Functions Virtualization (NFV) framework.

An overview of the Network Functions Virtualization (NFV) framework is shown in FIG. 1. The NFV framework consists of three main components, namely the Virtualized Network Function (VNF) block 102, the Network Functions Virtualization Infrastructure (NFVI) block 103 and the Management and Orchestration (MANO) block 104. The OSS/BSS block 101 consists of the traditional Operations Support System/Business Support System operated by telecommunication service providers to support a range of telecommunication services.

The VNF block 102 comprises Virtual Network Functions (VNFs) $105_{1-6}$, which are software implementations of network functions deployed in virtual machines provided by the Network Functions Virtualization Infrastructure (NFVI) 103. VNFs $105_{1-6}$ can be deployed as standalone functions, or as combinations of functions. According to the NFV framework, the communication protocols used to implement the functions of a VNF need not be aware of the fact that they are being implemented on a virtual machine. Accordingly, VNFs $105_1$ to $105_6$ can communicate with each other in multiple ways without knowledge that they are not physically connected, or running on dedicated hardware. For example, VNF $105_4$ could be deployed to provide a firewall function between an outside network and VNF $105_1$, which itself could be deployed to provide a routing function.

NFVI block 103 comprises the totality of hardware and software components that build the environment in which the VNFs $105_{1-6}$ are deployed. The NFVI block 103 can span a number of different physical locations, and the network providing connectivity between these locations is considered as part of the NFVI block 103. The NFVI block 103 typically comprises virtual computing resources 106, virtual storage resources 107 and virtual network resources 108, as well as computing hardware 110, storage hardware 111 and network hardware 112. The virtualization layer 109 allocates available hardware 110, 111 and 112 to virtual resources 106, 107 and 108 in order to make VNFs $105_{1-6}$.

The Management and Orchestration (MANO) block 104 comprises the Orchestrator 115, which extends the OSS/BSS, and manages and orchestrates the operation and deployment of the NFVI and the VNFs. The MANO block 104 also comprises a number of VNF Managers 114. These instantiate new VNFs $105_{1-6}$ by communicating with the Virtualized Infrastructure Manager (VIM) 113 in order to ensure that the VM upon which any new VNF $105_x$ is instantiated is allocated with the appropriate amount of hardware resources. Finally, the VIM 113 receives instructions from the Orchestrator 115 and the VNF Managers 114 in order to allocate hardware resources 110, 111 and 112 to particular VMs, upon which will be deployed VNFs $105_{1-6}$.

From time to time, customers or third parties will be required to characterize, verify, test or otherwise interact with a given $VNF_x$ by way of having that $VNF_x$ perform a specific task. One advantageous way of accomplishing this is by use of a scripting language, which is a program that is interpreted in a specific run-time environment, and which automates the execution of one or more tasks that could alternatively be executed sequentially by a human operator.

Often, however, the customer or third party will be using a network which is outside the security provisions provided by the NFV framework. Accordingly, having a specific $VNF_x$ perform a task can be considered as a two-step process. The first step is connecting with the specific $VNF_x$ and the second step is sending instructions to the $VNF_x$ to execute the task.

Because of the aforementioned significant security burdens inherent in the NFV architecture, e.g. the creation of multiple security zones, as well as the abstraction of hardware resources into decoupled virtual resources, the first of the above steps is time consuming and cumbersome to execute. In essence, there are currently two options available.

The first option is to connect to the $VNF_x$ by way of a Virtual Private Network (VPN). This solution suffers considerable drawbacks, however. If using a VPN, the customer or third party must know to which IP address it must connect. Thus, a customer or third party will need to communicate with the network administrator to locate the VNF in the network before attempting to establish communications. Moreover, there must also be a cryptographic key exchange between the network administrator and the customer or third party to initiate the VPN tunnel. Accordingly, the very high degree of coordination required between network administrator and customer or third party makes this a time consuming and burdensome process.

The second option is that of setting up a jump server between the customer or third party's network and the $VNF_x$. While this may not require the management and communication of cryptographic keys, creating the jump server is much more burdensome than initiating the VPN tunnel, and still requires a high degree of coordination with the network administrator. Moreover, the utilization of a jump server represents a significant increase in security risk over the utilization of a VPN, as the jump server will have access to the entirety of the secured network/zone.

Figure 2:
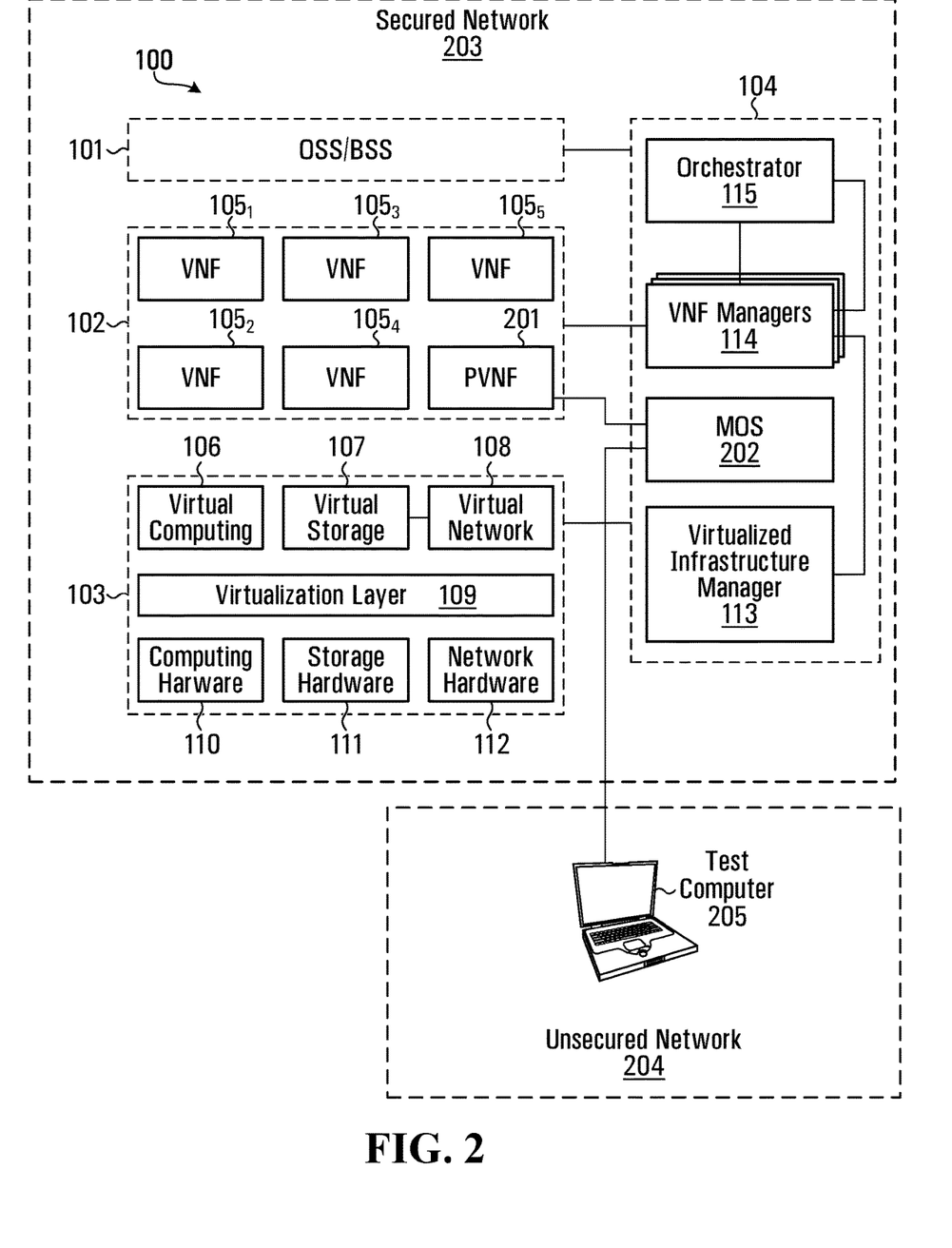
FIG. 2 illustrates a simplified logical network diagram of an example system for carrying out a programmable secure proxy shell in accordance with an embodiment.

FIG. 2 shows a system in accordance with an embodiment. In particular, a test computer 205 used by, for example, a customer or other third party is located on an unsecured (e.g. public) network 204. The NFV MANO block 104 further comprises a Management and Orchestration Server (MOS) 202, which acts as a VNF manager and orchestrator. An example of a MOS 202 is the Applicant's Worx™ network performance management system, which provisions and manages a network of performance test point VNFs referred to as EXFO Verifiers™. Examples of other MOS 202 could include any OpenStack™, Xen™ or VmWare™ VNF manager and orchestrator, such as Open Source MANO™, OPEN-O™, CORD™ (Central Office Re-architected as a Datacenter), or Gigaspaces™ Cloudify™. The deployment of performance test point VNFs at various points across a network allows the specifying of service-level objectives, the scheduling and running of network tests and the provisioning of detailed performance reports.

The system and method disclosed is not, however, limited to the use of management and orchestration servers, and can be used with any other suitable server or software engine capable of controlling a VNF 105$_x$ from outside its security zone, by way of a secured network connection. MOS 202 can either be a hardware server or a virtual server.

MOS 202 can be accessed from an unsecured network by way of a software interface, such as a REpresentational State Transfer Application Program interface (REST API), or any other suitable software interface, such as, for example, Simple Object Access Protocol (SOAP), Practical Extraction and Reporting Language (Perl), a command line interface or Python. In the example shown in FIG. 2, test computer 205, which is located on unsecured network 204, connects to MOS 202 by way of a REST API.

In an example embodiment, the VNF being controlled by the MOS 202 is a performance test point VNF that is operable as a Secure Shell (SSH) client, referred herein as Proxy Virtual Network Function (PVNF) 201. As will become apparent to the skilled reader, the system and method disclosed are not, however, limited to the use of a performance test point VNF. Examples of other VNFs that can be used include session border controllers, load balancers, firewalls, etc. Any VNF, hardware device or software agent capable of establishing proxy control of a command line interface of a target VNF, or capable of affecting remote execution of scripting instructions on a target VNF can be used.

This can be accomplished by way of a secured cryptographic network protocol such as, for example, SSH, or an unsecured protocol such as Telnet.

In the embodiment of FIG. 2, VNFs 105$_{1-5}$ are all located in the same virtualized network security zone, along with PVNF 201. A virtualized network security zone is an area of an NFV network in which VNFs share common security policies. Accordingly, in the embodiment of FIG. 2, PVNF 201 can establish secured communication with any other target VNF by way of a shared communication protocol, such as SSH, provided that the target VNF can communicate over the cryptographically secured communication channel using the shared communication protocol.

Figure 3:
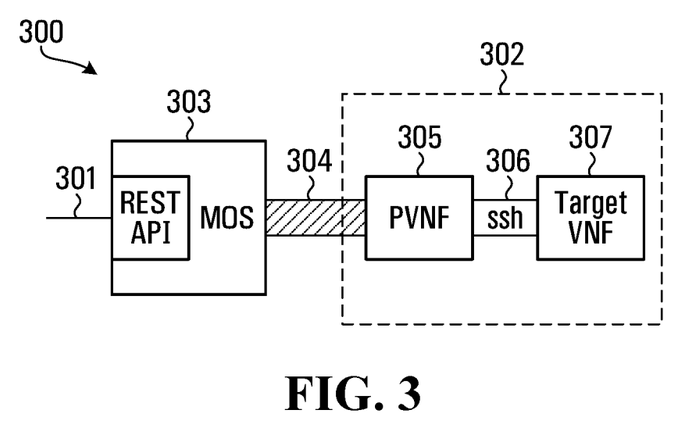
FIG. 3 illustrates a compact logical network diagram of the system of FIG. 2.

A detailed example embodiment 300 of the system is shown in FIG. 3, in which a computer (not shown), such as, for example, test computer 205 of FIG. 2, connects to MOS 303 via connection 301, by way of, for example, an exchange of security credentials. Control of MOS 303 by the computer is established using a REST API. MOS 303 is located outside NFV security zone 302, and is configured to establish secured communication with PVNF 305 via communication channel 304. Secured communication between MOS 303 and PVNF 305, over channel 304, can be established by way of any suitable means, and preferably by way of asymmetrical cryptography. PVNF 305 is a VNF capable of acting as a SSH client, and the target VNF 307 is a VNF capable of acting as an SSH server. Because PVNF 305 and Target VNF 307 are in the same NFV security zone 302, they share the same security policies. In the present embodiment, the PVNF 305 is a performance test point VNF, such as the Applicant's EXFO Verifiers™. Any OpenStack™, Xen™, or VmWare™ PVNF instance could serve as an example of a PVNF 305.

Figure 4:
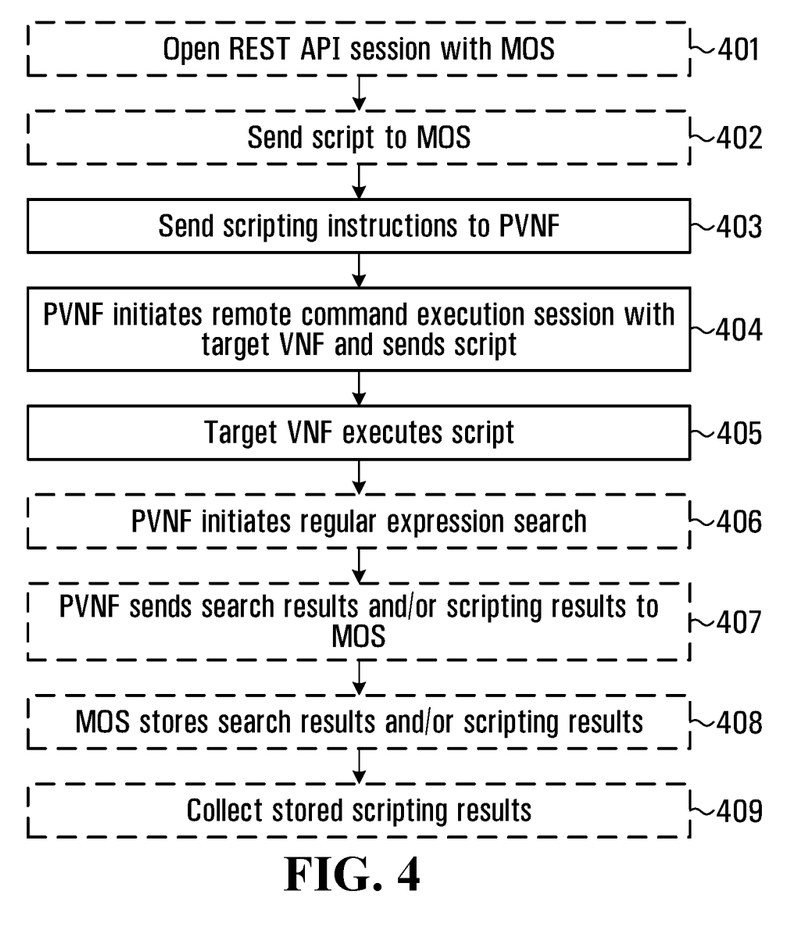
FIG. 4 illustrates a flowchart representing an example method of carrying out a programmable secure proxy shell in accordance with an embodiment.

A method of proxy scripting in a NFV environment is illustrated in FIG. 4. In step 401, the test computer 205 opens a REST API session with the MOS 303 and triggers a scripting process. Then, in step 402, a user of test computer 205, a computing device located outside the network functions virtualization network, can send scripting instructions, via a software interface such as a REST API, to MOS 303, over communication channel 301. In step 403, MOS 303 then prepares and sends script forwarding instructions to the PVNF 305 using the script that was sent by the test computer 205. The script forwarding instructions comprise a script that is to be executed on the target VNF 307, as well as a forwarding script, to be run on the PVNF 305 and that will cause the PVNF 305 to initiate a proxy scripting session (also referred to as a remote command execution session) with the target VNF 307 and forward the script to the target VNF 307. The script forwarding instructions can be sent using any suitable communication protocol, provided that they are operable to cause the PVNF 305 to forward the script to target VNF 307 for execution. The scripting instructions are therefore indicative of a script to be executed on the target virtual network function and include information identifying the target virtual network function.

In the present embodiment, the script forwarding instructions comprise a script making use of the SSH sshpass and ifconfig utility commands to initiate the SSH session. As will be readily understood by one skilled in the art, the sshpass command enables non-interactive SSH password authentication. It allows to establish an SSH connection by specifying a password as part of the command. The ifconfig command stands for "interface configuration" and is used to configure, or view the configuration of, a network interface.

As will be readily understood, opening the remote command execution session from the proxy virtual network function to the target virtual network function over a SSH protocol necessitates initiating the session. In the above script, the session is initiated using the sshpass utility command. In other embodiments, it could be initiated in other ways, for example using an Expect script or programmatically by writing an executable that uses low-level openssh APIs to open the ssh connection.

An example script syntax for the script forwarding instructions is:

sshpass-p password ssh user@host ifconfig>$FILE_OUT

FILE_OUT, in this example, is an environment variable pointing the location of a file that will be uploaded back to MOS 303 to provide it with configuration instructions.

In alternative embodiments, the script forwarding instructions can be sent together with the script to be run on the target VNF 307 directly to the MOS 303 from the test computer 205, by way of a REST API.

In step 404, execution of the scripting instructions then causes the PVNF 305 to initiate an SSH session (that is, open a remote command execution session) with the target VNF 307 and sends the target VNF 307 the script that is to be executed. Example scripts that can be executed will be described below. In step 405, target VNF 307 executes the script and sends at least a portion of the scripting results back to PVNF 305. In step 406, the PVNF 305 initiates a regular expression search to find specific information in the scripting results produced by the running of the script, thereby producing search results. Scripting results can include, for example, query results from specific databases, such as Structured Query Language (SQL) queries.

The PVNF 305 then sends at least a portion of the search results and/or the scripting results to MOS 303 in step 407. In step 408, the MOS 303 stores the received search results and/or scripting results. The test computer 205 can then retrieve and collect the stored search results and/or scripting results by opening another a communication link, such as a REST API session, with the server. Depending on the specific application, it will not always be required to use both scripting results and search results. In particular, in may be advantageous to include only search results in order to keep the amount of information being transmitted to a minimum. On the other hand, for specific applications, such as troubleshooting the target VNF 307, for example, sending both search results and scripting results can be beneficial in order to validate the output of the script and/or the regular expression.

When execution of the script on the target virtual network has produced scripting results, a second script can be selected from a script library based on at least part of the scripting results. The second script can be executed on the target virtual network function. The selection of the second script may be performed by the PVNF or the target virtual network function. This could be used, for example, to trigger a second script depending on the results of a test contained in the first script.

One example of a validation script that can be used with any embodiment is aimed at validating the W configuration of a newly instantiated target VNF 307, as follows:

```
#!/bin/sh
sshpass -p password ssh user@host ifconfig > $FILE_OUT
cat $FILE_OUT \ grep 'inet' \ awk '{print $2)' \ grep '^[0-9]\{1,3\}[.]
[0-9]\{1,3\}[.][0-9]\{1,3\}[.][0-9]\{1,3\}'
```

The purpose of the cat command, piped to a grep then to an awk, then again to a grep is to validate the format of the IP address reported by ifconfig.

The exit code of the shell script, in this example, is reported back to MOS 303.

Another example of a specialized test script that can be used with any embodiment of the present disclosure is aimed at executing an SQL query to perform a transaction on an SQL database. The transaction on the SQL database generates an output in response to the running of the script, which output is then retrieved. An example of such an SQL query is aimed at generating a Portable Object (PO) file and Billing File (BF) and ensuring they contain a predefined record. The below example script is arranged to make the target VNF 307 download then execute the SQL request inside script.sh and confirm that the generated file contains the expected predefined record. The script would be run separately for the PO and the BF file, with different script.sh targets.

```
#!/bin/sh
sshpass -p password ssh user@host curl\ -u\ ftp-user:ftp-password\ ftp:\/
\/ftp-host\/script.sh\ -o\script.sh\;.\/script.sh >> $FILE_OUT
cat $FILE_OUT \ grep -i expected_PO_or_billing_record
```

Yet another example of a script that can be used with any embodiment of the present disclosure is aimed at having a target VNF 307 performing network capture. The below example script is arranged to perform a tcpdump command on a newly instantiated target VNF 307 to capture network traffic being received on the target VNF 307, with a view to troubleshooting networking issues.

```
#!/bin/sh
sshpass -p password ssh user@host tcpdump\ -i\ eth0\ -c\ 20>
$FILE_OUT
cat $FILE_OUT
```

The sending of scripting instructions from the server to the PVNF can be triggered internally by the server, can be triggered periodically or can be triggered by a network-related event.

As will be appreciated, the above scripts are provided as explanatory examples only and should not be considered limiting. Other scripts that can be used will be readily apparent to the skilled reader.

Figure 5:
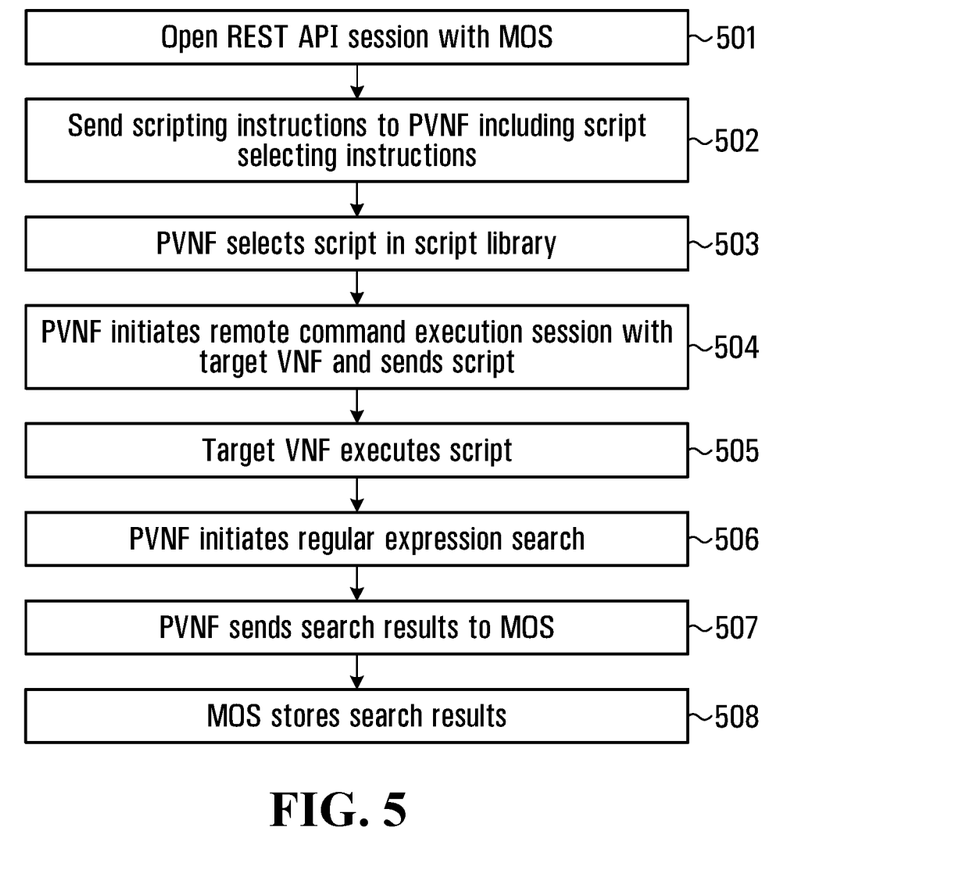
FIG. 5 illustrates a flowchart representing an example method of carrying out a programmable secure proxy shell in accordance with an embodiment in which a script library is accessed.

FIG. 5 illustrates a flowchart representing an example method of carrying out a programmable secure proxy shell in accordance with an embodiment. The method can be performed by the system of FIG. 3, when appropriately configured.

In step 501, a user of a test computer 205 opens a REST API session with the MOS 303. As is the case in the method illustrated in FIG. 4, initial scripting instructions can be sent to MOS 303 via a REST API, from test computer 205, or can be generated by MOS 303 in response to other instructions received from the test computer 205. Once ready, MOS 303 sends proxy scripting instructions to PVNF 305 in step 502. In the embodiment of FIG. 5, the proxy scripting instructions include script selecting instructions which, when interpreted by the PVNF 305, cause the PVNF 305 to select a particular script in a script library, which script library can be located locally or remotely. In step 504, once the PVNF 305 has accessed the script from the script library, it initiates an SSH session with the target VNF 307 and sends the target VNF 307 the script that is to be executed. In step 505, target VNF 405 executes the script and sends the scripting results back to PVNF 305. In step 506, the PVNF 305 initiates a regular expression search to find specific information in the scripting results produced by the running of the script, and produce search results. The PVNF 305 then sends the search results and/or the scripting results to MOS 303 in step 507. Finally, in step 508, the MOS 303 stores the search results and/or scripting results. The test computer 205 can then retrieve the stored search results and/or scripting results by opening another REST API session.

In another embodiment, it is the script sent to the target VNF 307 that is configured to fetch a script from a script library, as opposed to the scripting instructions or script sent to the PVNF 305.

Figure 6:
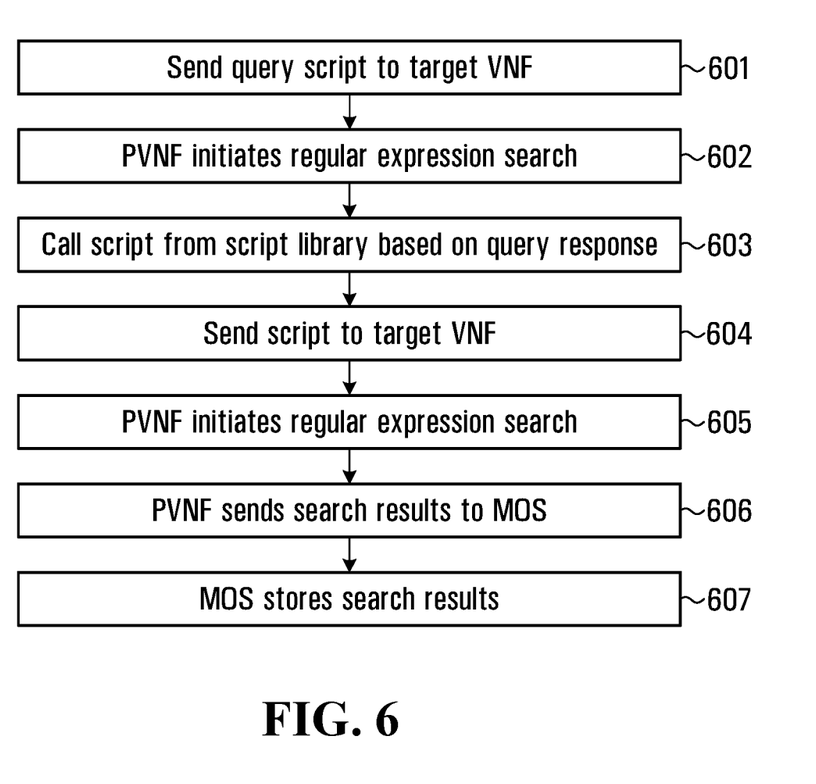
FIG. 6 illustrates a flowchart representing an example method of carrying out a programmable secure proxy shell in accordance with an embodiment in which a query script is used.

FIG. 6 illustrates a flowchart representing an example method of carrying out a programmable secure proxy shell in accordance with an embodiment. With reference to the method illustrated in FIG. 5, instead of sending a single script to the target VNF 307, the PVNF 305 can initially send a query script to the target VNF 307, as shown in step 601. A query script can be any script that, once executed by a target VNF 307 is capable of returning information characterizing the target VNF 307 in some way. The results of the query script can then be sent back to the PVNF 305, and used in the process of selecting a suitable script from a script library, based on the information characterizing the target VNF 307. A non-limiting example of a query script is one which aims to return the type of Operating System (OS) being run by the target VNF 307.

In this example, PVNF 305 initiates a regular expression search at step 602 in order to determine the characterizing information of target VNF 307. In step 603, the PVNF 305 selects a script from a script library based on the characterizing information of target VNF 307. The script library can be located locally or remotely from the PVNF 305. In the example given above, when the identity of the OS being run on target VNF 307 is returned to PVNF 305, PVNF 305 can select a script from the script library that is configured to be run on the particular OS identified by the characterizing information of target VNF 307.

In another embodiment, the PVNF 305 can be configured to amend the content of a script based on the characterizing information of the target VNF 307, as opposed to selecting a script from a library, the amendment of the script allowing it to be interpreted by the target VNF 307.

The following script is a non-limiting example of a script, that can be sent from the MOS 303 to the PVNF 305, and that will result in the PVNF 305 executing a two-step proxy scripting method, as described above:

```
#!/bin/sh
sshpass -p password ssh user@host uname -a > $FILE_OUT
sshpass -p password ssh user@host curl\ -u\ ftp-user:ftp-password\ ftp:\/\/
ftp-host\/`cat $FILE_OUT|awk '{print substr ($3, 0, 4)}'`\ -o\
script.sh\;.\/script.sh >> $FILE_OUT
cat $FILE_OUT
```

Once the script is selected, at step 604, PVNF 305 sends the script to target VNF 307 for execution. Once the script is executed, PVNF 305 can initiate regular expression search on the scripting results in order to extract specific information, thereby creating search results. Once extracted, PVNF 305 sends the search results and/or the scripting results to MOS 303. At step 607, MOS 303 stores the search results and/or the scripting results. Test computer 205 can then retrieve the search results and/or the scripting results from MOS 303 via a REST API.

Another example of a multiple-step proxy scripting method is that of a PVNF 305 being instructed to initially run a test script on each of the VNFs in its security zone/secured network in order to determine their port configuration. For example, the script provides the PVNF 305 with an indication of, for each VNF, whether a Domain Name System (DNS) is operating on port 53. This allows the PVNF 305 to determine which VNFs are configured as servers. Once the VNF servers are identified in the security zone/secured network, the PVNF 305 follows up by sending each server VNF with a server-specific script that queries, configures, tests or otherwise acts upon each server when interpreted by that respective server.

In another embodiment, MOS 303 is configured to automatically carry out a programmable secure proxy shell in accordance with an embodiment, for example within the context of ensuring compliance with a network operator's Service Level Agreement (SLA). In an exemplary embodiment, MOS 303 routinely sends various scripts to the PVNF 305, for forwarding to the target VNF 307. Once the script is executed, PVNF 305 initiates regular expression search on the scripting results in order to extract specific information. The PVNF 305 then sends the extracted specific information and/or the scripting results to MOS 303. At step 607, MOS 303 stores the extracted specific information and/or the scripting results for ultimate retrieval by the test computer 205 via a REST API.

Accordingly, it will be appreciated by the skilled reader that the disclosed systems and methods provide a very high degree of flexibility in automating and batch processing proxy scripting functionality. Moreover, the disclosed methods and systems can fully take advantage of the scalability of NFV-based cloud-computer platforms such as OpenStack™, because PVNFs can be instantiated almost anywhere in a network (i.e. operably close to any target VNF) with little effort and complexity, and all of those (or a subset of those) PVNFs can be managed by a single MOS 303.

Figure 7:
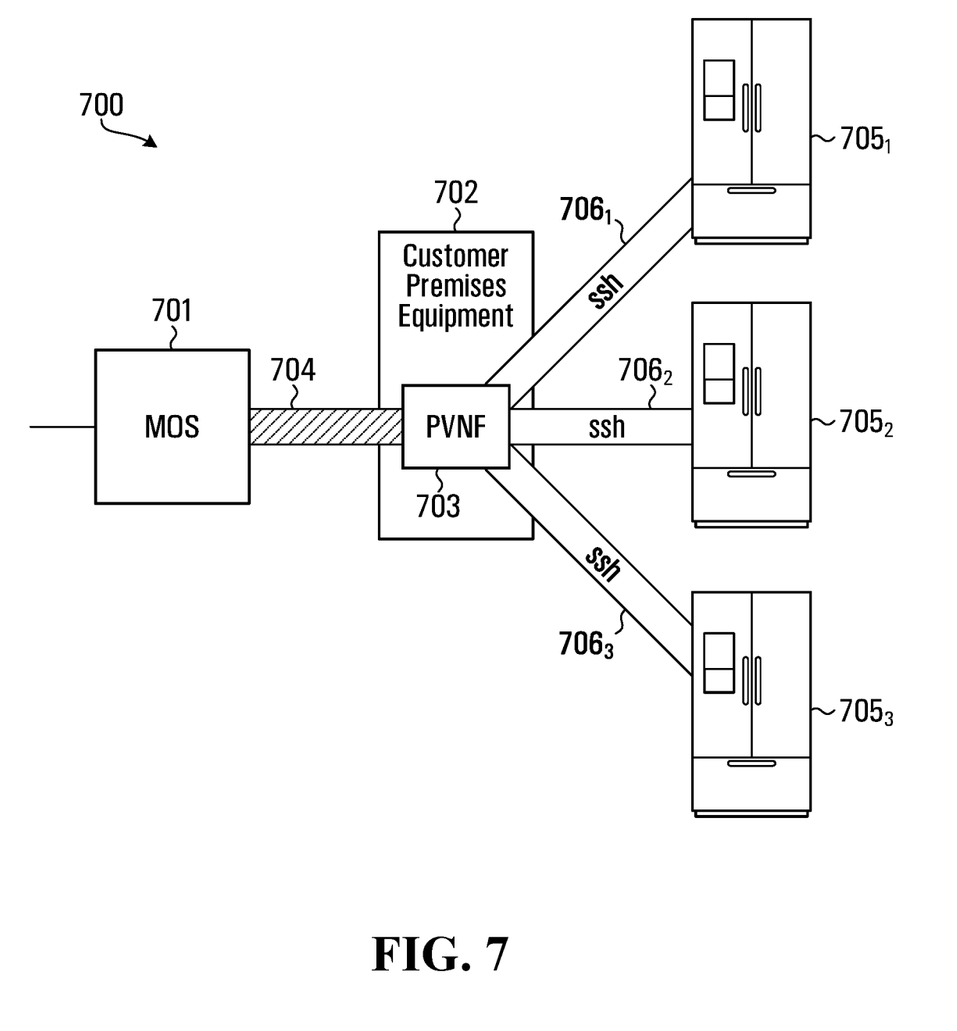
FIG. 7 illustrates a simplified logical network diagram of an example Internet of Things (IoT) system in accordance with an embodiment.

As will be appreciated by the skilled reader, several embodiments will be particularly advantageous when used in the field of the Internet of Things (IoT). For example, FIG. 7 shows an IoT embodiment. The system 700 of FIG. 7 comprises a Customer Premises Equipment (CPE) 702 installed at a customer's premises, and connected to telecommunication carrier's channel via a demarcation point. In the embodiment of FIG. 7, the CPE is a router located at a commercial establishment. The skilled reader will appreciate that the CPE can be other entities, such as routers, switches, telephone, residential gateways, set-top boxes, for example. In an NFV network, it is possible to instantiate a PVNF 703 in CPE 702, and have that PVNF 703 be controlled by a MOS 701 connected thereto via a secured communication channel 704. Similarly, it is possible to instantiate a target VNF on a number of IoT devices sharing common security policies with the PVNF 703.

Depending on the CPE on which the PVNF is instantiated, the MOS will be able to use PVNFs to preform proxy scripting on a whole host of IoT devices. Non-limiting examples include 1) a PVNF instantiated on a set-top box CPE and one or more target VNFs instantiated on one or more television sets, 2) a PVNF instantiated on a residential gateway CPE and one or more target VNFs instantiated on one or more vehicles, and 3) a PVNF instantiated on a fixed mobile convergence product CPE and one or more target VNFs instantiated on one or more mobile telecommunication devices. The VNF is therefore located on a physical device, a vehicle or a home appliance which forms part of an IoT network.

In the embodiment of FIG. 7, PVNF 703 is connected to a number of smart refrigerators $705_{1-3}$, via communication links $706_{1-3}$. Communication links $706_{1-3}$ can be wired or wireless. By connecting with the MOS 701, a computer could initiate the method described in FIG. 4 on the system of FIG. 7. For example, using a proprietary script developed by the refrigerator manufacturer, the PVNF 703 could implement a proxy scripting process, resulting in the proprietary script being run on the target VNF of the refrigerator $705_2$ in order to determine if some aspect of the refrigerator is functioning properly.

In another embodiment, the system 700 is used to implement a modified version of the method shown in FIG. 6. In particular, the PVNF 703 can be arranged to send a query script to each refrigerator $705_1$, $705_2$, and $705_3$ in order to query the release number of their firmware. Using the results, the PVNF 703 can select and send appropriate scripts to be interpreted on each refrigerator $705_x$, depending on each refrigerator's firmware release number. Alternatively, the PVNF 703 can send a script to each refrigerator $705_1$, $705_2$, and $705_3$ that will cause the target VNF in the refrigerator to select the appropriate upgrade script form a script library, based on knowledge of its own firmware version.

The skilled reader will readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The embodiments are also intended to cover computers programmed to perform said steps of the above-described methods.

It should be appreciated by those skilled in the art that any block diagrams herein represent conceptual views of illustrative circuitry embodying the principles disclosed herein. Similarly, it will be appreciated that any flow charts and scripts and the like represent various processes which may be substantially represented in computer readable medium and so executed by a computer or processor, whether or not such computer or processor is explicitly shown.

Although various embodiments and examples have been presented, this was for purposes of description, but should not be limiting. Various modifications and enhancements will become apparent to those of ordinary skill in the art.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

The invention claimed is:

1. A method of proxy scripting in a network functions virtualization network, the method comprising the steps of:
responsive to a server receiving scripting instructions from a test computer on an unsecured network, sending the scripting instructions from the server to a proxy virtual network function, the scripting instructions being indicative of a script to be executed on a target virtual network function, wherein the proxy virtual network function and the target virtual network function are on the network functions virtualization network that shares security policies and is separate from the unsecured network;
in response to receiving the scripting instructions by the proxy virtual network function, opening a remote command execution session from the proxy virtual network function to the target virtual network function;
sending the script from the proxy virtual network function to the target virtual network function; and
executing the script on the target virtual network function, wherein the script is for a test of the target virtual network function, and the method further comprises:
responsive to the executing the script on the target virtual network function, performing a regular expression search by the proxy virtual network function on scripting results from the target virtual network function to find specific information in the scripting results produced by running of the script, thereby producing search results of the specific information, and sending the search results to the server; and
providing the search results to the test computer from the server.

2. The method of claim 1, wherein the scripting instructions comprise script forwarding instructions that cause the proxy virtual network function to perform the opening a remote command execution session step and the sending the script steps.

3. The method of claim 1, wherein the scripting instructions include information identifying the target virtual network function.

4. The method of claim 1, wherein the scripting instructions comprise script selecting instructions that when executed by the proxy virtual network function, cause the proxy virtual network function to select the script from a script library, and the method further includes the step of selecting the script from a script library.

5. The method of claim 1, wherein the script comprises script selecting instructions that when interpreted by the target virtual network function cause the target virtual network function to select the script from a script library, and the method further includes the step of selecting the script from a script library.

6. The method of claim 1, wherein execution of the script on the target virtual network produced scripting results, and the method further includes the step of:
sending at least a portion of the scripting results from the target virtual network function to the proxy virtual network function.

7. The method of claim 6, further comprising the steps of:
sending the at least a portion of the scripting results of the executed script from the proxy virtual network function to the server; and
storing the at least a portion of the scripting results on the server.

8. The method of claim 7, further comprising the steps of:
opening a communication link with the server from a computing device located outside the network functions virtualization network; and
collecting the at least a portion of the stored scripting results from the server.

9. The method of claim 1, wherein the test computer communicates with the server by way of a software interface and wherein said software interface is a REST API interface.

10. The method of claim 1, wherein the server is on a different network than the unsecured network and the network functions virtualization network, and wherein the server sends the scripting instructions to the proxy virtual network function over a cryptographically secured communication channel.

11. The method of claim 1, wherein the step of opening a remote command execution session from the proxy virtual network function to the target virtual network function includes opening a session over a Secure Shell (SSH) protocol.

12. The method of claim 11, wherein the Secure Shell (SSH) session is initiated using the sshpass utility command.

13. The method of claim 1, wherein the server is a virtual server.

14. The method of claim 1, wherein the server is a virtual network function management and orchestration server.

15. The method of claim 14, wherein the proxy virtual network function is a network performance test point virtual network function.

16. The method of claim 1, wherein the step of sending scripting instructions from the server to the proxy virtual network function is triggered one of internally by the server, periodically and by a network-related event.

17. The method of claim 1, wherein said step of executing the script on the target virtual network function further comprises producing scripting results, and the method further includes the step of:
selecting a second script from a script library based on at least part of the scripting results, said selecting being performed by one of the proxy virtual network function and the target virtual network function; and
executing the second script on the target virtual network function.

18. The method of claim 1, wherein the proxy virtual network function is instantiated in a customer premises equipment, and the target virtual network function is located on a physical device, vehicle or home appliance which forms part of an Internet of Things (IoT) network.

19. The method of claim 1, wherein the proxy virtual network function is provided on a hardware device.

20. The method of claim 1, wherein the proxy virtual network function is provided on a software agent.

21. A non-transitory computer readable medium storing a computer program comprising executable instructions that when executed by a computer system to cause the computer system to implement a method comprising the steps of:

responsive to a server receiving scripting instructions from a test computer on an unsecured network, receiving the scripting instructions from the server at a proxy virtual network function, the scripting instructions being indicative of a script to be executed on a target virtual network function, wherein the proxy virtual network function and the target virtual network function are on the network functions virtualization network that shares security policies and is separate from the unsecured network;

in response to receiving the scripting instructions by the proxy virtual network function, opening a remote command execution session from the proxy virtual network function to the target virtual network function;

sending the script from the proxy virtual network function to the target virtual network function; and responsive to executing the script on the target virtual network function, receiving results of the script at the proxy virtual network function, wherein the script is for a test of the target virtual network function, and the method further comprises:

responsive to the executing the script on the target virtual network function, performing a regular expression search by the proxy virtual network function on scripting results from the target virtual network function to find specific information in the scripting results produced by running of the script, thereby producing search results of the specific information, and sending the search results to the server; and providing the search results to the test computer from the server.

22. A system for proxy scripting in a network functions virtualization network, the system comprising a server arranged to receive scripting instructions from a test computer on an unsecured network and send the scripting instructions to a proxy virtual network function, the scripting instructions being indicative of a script to be executed on a target virtual network function, wherein the proxy virtual network function and the target virtual network function are on the network functions virtualization network that shares security policies and is separate from the unsecured network;

the proxy virtual network function arranged to, upon execution of the scripting instructions, open a remote command execution session with the target virtual network function and send the script to the target virtual network function; and the target virtual network function arranged to receive the script from the proxy virtual network function and execute the script, wherein the script is for a test of the target virtual network function, and the target virtual network function is further arranged to execute the script on the target virtual network function, and the proxy virtual network function is arranged to perform a regular expression search on scripting results from the target virtual network function to find specific information in the scripting results produced by running of the script, thereby producing search results of the specific information.

23. The method of claim 1, wherein the scripting results include Structured Query Language (SQL) query results.

* * * * *